United States Patent
Stratan et al.

(10) Patent No.: US 12,141,331 B2
(45) Date of Patent: Nov. 12, 2024

(54) UNDEFINED LIFECYCLE STATE IDENTIFIER FOR MANAGING SECURITY OF AN INTEGRATED CIRCUIT DEVICE

(71) Applicant: Google LLC, Mountain View, CA (US)

(72) Inventors: Andrei Tudor Stratan, San Jose, CA (US); Olivier Jean Benoit, San Diego, CA (US)

(73) Assignee: Google LLC, Mountain View, CA (US)

( * ) Notice: Subject to any disclaimer, the term of this patent is extended or adjusted under 35 U.S.C. 154(b) by 362 days.

(21) Appl. No.: 17/636,892

(22) PCT Filed: Aug. 24, 2020

(86) PCT No.: PCT/US2020/047685
§ 371 (c)(1),
(2) Date: Feb. 20, 2022

(87) PCT Pub. No.: WO2022/046027
PCT Pub. Date: Mar. 3, 2022

(65) Prior Publication Data
US 2022/0269825 A1 Aug. 25, 2022

(51) Int. Cl.
*G06F 21/00* (2013.01)
*G06F 21/31* (2013.01)
(Continued)

(52) U.S. Cl.
CPC .............. *G06F 21/75* (2013.01); *G06F 21/31* (2013.01); *G06F 21/577* (2013.01); *G06F 21/602* (2013.01); *G06F 21/79* (2013.01)

(58) Field of Classification Search
CPC ...... G06F 21/31; G06F 21/577; G06F 21/602; G06F 21/75; G06F 21/79
See application file for complete search history.

(56) References Cited

U.S. PATENT DOCUMENTS

| 2012/0102334 A1 | 4/2012 | O'Loughlin et al. |
| 2015/0058669 A1 | 2/2015 | Salle |

(Continued)

FOREIGN PATENT DOCUMENTS

| WO | 2016043962 | 3/2016 |
| WO | 2019142345 | 7/2019 |

OTHER PUBLICATIONS

"International Search Report and Written Opinion", Application No. PCT/US2020/047685, Apr. 26, 2021, 11 pages.
(Continued)

*Primary Examiner* — Jeffrey C Pwu
*Assistant Examiner* — Thong P Truong
(74) *Attorney, Agent, or Firm* — Colby Nipper PLLC (57) ABSTRACT

This document describes methods and systems that use an undefined lifecycle state identifier to manage security of a system-on-chip (SoC) integrated circuit (IC) device. As part of the described techniques, the SoC IC device may include a first set of logic integrated circuitry that determines that a first combination of bit values fails to correspond to a known lifecycle state identifier. The first set of logic integrated circuitry may then provide, to a second set of logic integrated circuitry, a second combination of bit values that corresponds to the undefined lifecycle state identifier. The second set of logic integrated circuitry may then place the SoC IC device into an undefined lifecycle state.

20 Claims, 5 Drawing Sheets (51) Int. Cl.
    *G06F 21/57*     (2013.01)
    *G06F 21/60*     (2013.01)
    *G06F 21/75*     (2013.01)
    *G06F 21/79*     (2013.01)

(56) References Cited

U.S. PATENT DOCUMENTS

2017/0124354 A1    5/2017  Rohleder et al.
2018/0183613 A1*  6/2018  Dafali .................. G09C 1/00
2018/0189493 A1    7/2018  Schilder et al.
2018/0300441 A1   10/2018  Antony et al.
2020/0195675 A1    6/2020  Sofer et al.

OTHER PUBLICATIONS

"Foreign Office Action", TW Application No. 110122287, Apr. 27, 2022, 7 pages.

"International Preliminary Report on Patentability", Application No. PCT/US2020/047685, Feb. 28, 2023, 8 pages.

* cited by examiner

| # | BIT-FIELD | | | | LIFECYCLE STATE |
|---|---|---|---|---|---|
| 1 | 0 | 0 | 0 | 0 | UNKNOWN |
| 2 | 0 | 0 | 0 | 1 | TEST |
| 3 | 0 | 0 | 1 | 0 | UNKNOWN |
| 4 | 0 | 0 | 1 | 1 | UNKNOWN |
| 5 | 0 | 1 | 0 | 0 | PRODUCTION |
| 6 | 0 | 1 | 0 | 1 | UNKNOWN |
| 7 | 0 | 1 | 1 | 0 | UNKNOWN |
| 8 | 0 | 1 | 1 | 1 | DEBUG |
| 9 | 1 | 0 | 0 | 0 | UNKNOWN |
| 10 | 1 | 0 | 0 | 1 | UNKNOWN |
| 11 | 1 | 0 | 1 | 0 | UNKNOWN |
| 12 | 1 | 0 | 1 | 1 | UNDEFINED |
| 13 | 1 | 1 | 0 | 0 | UNKNOWN |
| 14 | 1 | 1 | 0 | 1 | RMA |
| 15 | 1 | 1 | 1 | 0 | RECOVERY |
| 16 | 1 | 1 | 1 | 1 | UNKNOWN |

UNDEFINED LIFECYCLE STATE IDENTIFIER FOR MANAGING SECURITY OF AN INTEGRATED CIRCUIT DEVICE

RELATED APPLICATION(S)

This application is a national stage entry of International Application No. PCT/US2020/047685, filed Aug. 24, 2020, the disclosure of which is incorporated herein by reference in its entirety.

BACKGROUND

The concept of lifecycle states is used in the integrated circuit (IC) industry to define functionality of complex devices, such as a System-on-Chip (SoC) IC device that might include, for example, logic integrated circuitry, memory integrated circuitry, and inputs/outputs. The lifecycle state may vary with a lifecycle of the SoC IC device, and include, for example, a test lifecycle state, a production lifecycle state, and a return lifecycle state. In general, the logic integrated circuitry may govern access to information being stored by the SoC IC device and secure operations being performed by the SoC IC device.

In general, an identifier that indicates the lifecycle state of the SoC IC device, i.e., a lifecycle state identifier, may be input to lifecycle state-keeping logic and, through logical behavior of the lifecycle state-keeping logic using the lifecycle state identifier as an input, effectuate access and/or security levels of the SoC IC device. In hopes of thwarting malicious hacking of lifecycle state identifiers, designers and manufacturers of SoC IC devices have attempted to increase the size of the bit-field of the lifecycle state identifier under the premise that a hacker will have a more difficult time altering a combination of bit values to a desired lifecycle state. However, the approach of increasing the size of the bit-field of the lifecycle state identifier has introduced unintended consequences, including an increase in the quantity of unknown lifecycle state identifiers, which: (i) increases the burden on a team of design engineers for evaluation and testing of logical behaviors of the lifecycle state-keeping logic, and (ii) increases opportunities for undefined SoC IC device behaviors that may result in security lapses.

SUMMARY

This document describes methods and systems that use an undefined lifecycle state identifier to manage security of a System-on-Chip (SoC) integrated circuit (IC) device. As part of the described techniques, the SoC IC device may include a first set of logic integrated circuitry that determines that the first combination of bit values fails to correspond to a known lifecycle state identifier. The first set of logic integrated circuitry may then provide, to a second set of logic integrated circuitry, a second combination of bit values that corresponds to the undefined lifecycle state identifier. The second set of logic integrated circuitry may then place the SoC IC device into an undefined lifecycle state.

In some aspects, a method performed by an SoC IC device is described. The method includes retrieving, by a first set of logic integrated circuitry and from non-volatile memory storage cells, a first combination of bit values. The first set of logic integrated circuitry determines that the first combination of bit values fails to correspond to a known lifecycle state identifier. The first set of logic integrated circuitry then provides, to a second set of logic integrated circuitry, a second combination of bit values that corresponds to an undefined lifecycle state identifier. The second set of logic integrated circuitry then places the SoC IC device into an undefined lifecycle state that prevents undefined SoC IC behaviors that lead to leaking data or functions available through the SoC IC device.

In other aspects, an apparatus is described. The apparatus includes non-volatile memory storage cells and logic integrated circuitry including a first set of logic integrated circuitry and a second set of logic integrated circuitry. The first set of logic integrated circuitry is configured to retrieve, from the non-volatile memory storage cells, a first combination of bit values and determine that the first combination of bit values fails to correspond to a known lifecycle state identifier. The first set of logic integrated circuitry is also configured to provide, to the second set of logic integrated circuitry, a second combination of bit values that corresponds to an undefined lifecycle state identifier. The second set of logic integrated circuitry is configured to place the apparatus into a secure, undefined lifecycle state that prevents undefined apparatus behaviors that lead to leaking of data or functions available through the apparatus.

The details of one or more implementations are set forth in the accompanying drawings and the following description. Other features and advantages will be apparent from the description, the drawings, and the claims. This summary is provided to introduce subject matter that is further described in the Detailed Description. Accordingly, a reader should not consider the summary to describe essential features nor threshold the scope of the claimed subject matter.

BRIEF DESCRIPTION OF THE DRAWINGS

The details of one or more aspects of using an undefined lifecycle state identifier to manage security of an SoC IC device are described below. The use of the same reference numbers in different instances in the description and the figures indicate similar mechanisms.

DETAILED DESCRIPTION

This document describes methods and systems that use an undefined lifecycle state identifier to manage security of an integrated circuit (IC) device. As part of the described techniques, the SoC IC device may include a first set of logic integrated circuitry that determines that a first combination of bit values fails to correspond to a known lifecycle state identifier. The first set of logic integrated circuitry may then provide, to a second set of logic integrated circuitry, a second combination of bit values that corresponds to the undefined lifecycle state identifier. The second set of logic integrated circuitry may then place the SoC IC device into an undefined lifecycle state.

In general, the state-keeping logic integrated circuitry may govern access to information being stored by the SoC IC device and secure operations being performed by the SoC IC device. Furthermore, and in general, levels of access and security may vary with lifecycle states. As examples, logical behavior of the SoC IC device in a test lifecycle state may enable a test engineer to configure the SoC IC device for functionality, trace a manufacturing history of the SoC IC device, or verify security keys stored within the SoC IC device. After the SoC IC device has been produced for a consumer, logical behavior of the SoC IC device in the production lifecycle state may enable the consumer to store, access, or transmit personal information from the SoC IC device. During the return lifecycle state of the SoC IC device, sometimes referred to as a return material authorization (RMA) lifecycle state, logical behavior of the SoC IC device may allow a technician to access debugging features to probe the SoC IC device.

An identifier that indicates the lifecycle state of the SoC IC device, i.e., a lifecycle state identifier, may be input to lifecycle state-keeping logic and, through logical behavior of the lifecycle state-keeping logic using the lifecycle state identifier as an input, effectuate access and/or security levels of the SoC IC device. A known lifecycle state identifier, or specific combination of bit values within a bit-field, may be input to the lifecycle state-keeping logic to "set" the SoC IC device to perform in accordance with an intentionally-designed (and tested) logical behavior, including allowing a user to access information being stored on the SoC IC device or granting the user the ability to execute code using the SoC IC device. However, the complexity of the lifecycle state-keeping logic on the SoC IC device often makes it impractical for a team of design engineers to contemplate and test impacts of lifecycle state identifiers having combinations of bit values that may be other than those that are associated with determined, known lifecycle state identifiers.

For lifecycle state identifiers that are not contemplated or tested during design of the logic integrated circuitry of the SoC IC device, behavior of the lifecycle state-keeping logic is often unknown and compromise security of the SoC IC device. Such a lifecycle state identifier, i.e., an unknown lifecycle state identifier, may be introduced through a reliability failure that alters bit values in non-volatile memory storage cells allocated for storing a lifecycle state identifier. In other instances, the unknown lifecycle state identifier may be maliciously introduced by a hacker using a variety of mechanisms. Alternatively, the hacker may simply alter the bit values of the non-volatile memory storage cells storing the lifecycle state identifier in hopes of setting the logical behavior of the SoC IC device to perform in one of many unknown lifecycle states, which may still provide the hacker access to sensitive information or allow the hacker to instruct the SoC IC device to execute malicious code.

Generally, a quantity of unknown lifecycle state identifiers is dependent on a size of a bit-field that may be allocated within the non-volatile memory integrated circuitry. For example, a team of design engineers may design the state-keeping logic to have four, specific logical behaviors for four specific combinations of lifecycle state identifiers. However, if a size of the bit-field that is allocated to the lifecycle state identifier is four bits, sixteen possible combinations of lifecycle state identifiers are possible, leaving twelve unknown lifecycle state identifiers that may effectuate twelve corresponding, unknown logical behaviors upon the lifecycle state-keeping logic. If the size of the bit-field that is allocated to the lifecycle state identifier is eight bits, two hundred and fifty-six combinations of lifecycle state identifiers are possible, leaving two hundred and fifty-two unknown lifecycle state identifiers that may effectuate two hundred and fifty-two corresponding, unknown logical behaviors upon the lifecycle state-keeping logic.

Security logic, which may detect and validate a lifecycle state of the SoC IC device, may be combined with the lifecycle state-keeping logic to address unknown lifecycle state identifiers. In an instance of determining that a lifecycle state identifier that may be stored within memory storage cells is not known, the security logic may provide an undefined lifecycle state identifier to the state-keeping logic which, in turn, secures the SoC IC device.

While features and concepts of using an undefined lifecycle state identifier can be implemented in any number of different environments and devices, aspects are described in the context of an example operating environment, example lifecycle state identifier details, example scenarios, example method, and additional examples below.

Example Operating Environment

Figure 1:
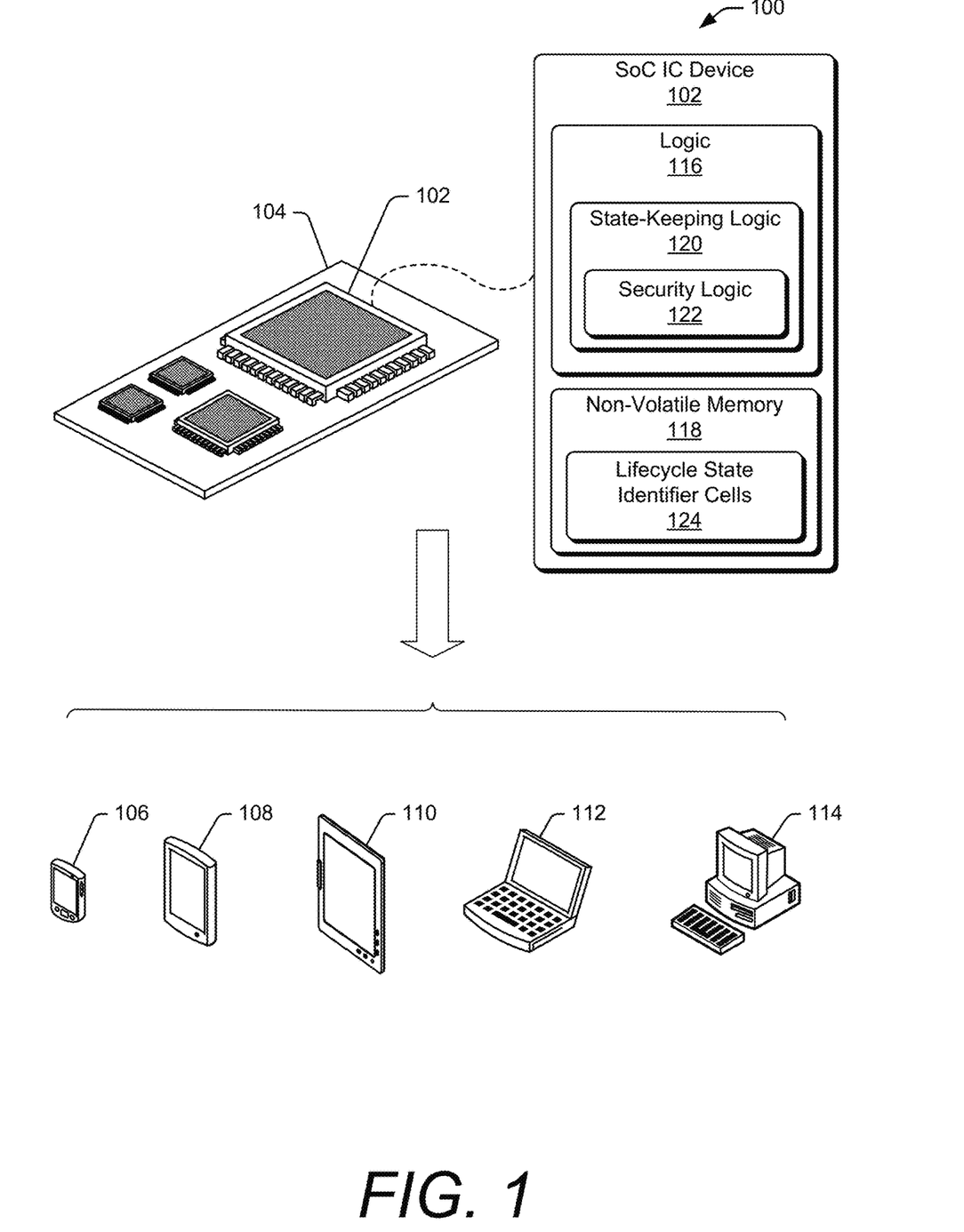
FIG. 1 illustrates an example operating environment in which aspects of using an undefined lifecycle state identifier to manage security of an SoC IC device can be implemented.

FIG. 1 illustrates an example operating environment 100 in which aspects of using an undefined lifecycle state identifier to manage security of an SoC IC device can be implemented. As illustrated, an SoC IC device 102 is mounted to a printed circuit board (PCB) 104 which may be included as part of a computing device that implements one or more security protocols. As non-limiting examples, the computing device may be a smartphone 106, a personal digital assistant 108, a tablet 110, a laptop 112, or a workstation 114.

The SoC IC device 102 may include logic integrated circuitry 116 and non-volatile memory integrated circuitry 118 fabricated onto a common silicon die. The logic integrated circuitry 116 may include a set of logic integrated circuitry (e.g., state-keeping logic integrated circuitry 120, which may include logic inputs, AND gates, OR gates, XOR gates, NAND gates, NOR gates, XNOR gates, NOT gates) that supports lifecycle state-keeping operations performed by the SoC IC device 102. Different combinations of binary data (e.g., combinations of bit values such as 1, 0) may be input into the state-keeping logic integrated circuitry 120 as part of the computing device executing an operating system, a wireless-communication application, a web-browsing application, and so on.

The logic integrated circuitry 116 may also include another set of logic integrated circuitry (e.g., security logic integrated circuitry 122, which may include combinations of logic inputs, AND gates, OR gates, XOR gates, NAND gates, NOR gates, XNOR gates, NOT gates) that manages security of the SoC IC device 102. Different combinations of binary data (e.g., combinations of bit values such as 1, 0) may be input into the security logic integrated circuitry 122 as part of security operations performed by the SoC IC device 102. Security operations may include, for example, detecting a lifecycle state of the SoC IC device 102 and determining whether the detected lifecycle state corresponds to a known lifecycle state or to an unknown lifecycle state.

The non-volatile memory integrated circuitry 118 may include memory storage cells to store binary data. Examples of the non-volatile memory integrated circuitry 118 include one-time programmable (OTP) memory integrated circuitry, flash memory integrated circuitry (e.g., NAND), read-only memory integrated circuitry (ROM), ferroelectric random-access memory integrated circuitry (RAM), or electronic fuses (e-fuses). In some instances, a portion of the memory storage cells (e.g., lifecycle state identifier cells 124) within the non-volatile memory integrated circuitry 118 may be dedicated to storing a bit-field containing a combination of bit values that correspond to a lifecycle state of the SoC IC device 102.

In some instances, a team of design engineers may design the logic integrated circuitry 116 and the non-volatile memory integrated circuitry 118 to jointly perform an operation that manages security of the SoC IC device 102. As an example, the security logic integrated circuitry 122 may be designed to retrieve a first combination of bit values from the lifecycle state identifier cells 124. The security logic integrated circuitry 122 may, as designed, determine that the first combination of bit values fails to decode to a known lifecycle state identifier (e.g., a combination of bit values that, if input to the state-keeping logic integrated circuitry 120, will cause the state-keeping logic integrated circuitry 120 to perform in accordance with known logical behaviors for a given lifecycle state).

In the event the first combination of bit values fails to decode to a known lifecycle state identifier, the security logic integrated circuitry 122 may provide, to the state-keeping logic integrated circuitry 120, a second combination of bit values that corresponds to an undefined lifecycle state. The design of the state-keeping logic integrated circuitry 120 may be such that, upon receiving the second combination of bit values that corresponds to the undefined lifecycle state, the state-keeping logic integrated circuitry 120 will place the SoC IC device 102 into the undefined lifecycle state. In the undefined lifecycle state, the SoC IC device 102 is secure, preventing an unauthorized agent (e.g., a malicious hacker) from accessing SoC IC device 102. Preventing the unauthorized agent from accessing the SoC IC device 102 may prevent a leak of sensitive information, execution of non-secure code, and so on.

Although the SoC IC device 102 is described in the context of a single SoC IC device including both the logic integrated circuitry 116 and the non-volatile memory integrated circuitry 118, a combination of discrete IC devices may perform the same functions. For example, a discrete processor IC device (e.g., a processor IC device having one or both of the state-keeping logic integrated circuitry 120 and the security logic integrated circuitry 122) may work in combination with a discrete non-volatile memory IC device having the lifecycle state identifier cells 124 to perform one or more functions described herein. Furthermore, the memory IC device may include volatile memory storage cells (such as dynamic random-access memory (DRAM) storage cells) as opposed to non-volatile memory storage cells.

Example Lifecycle State Identifier Details

Figure 2:
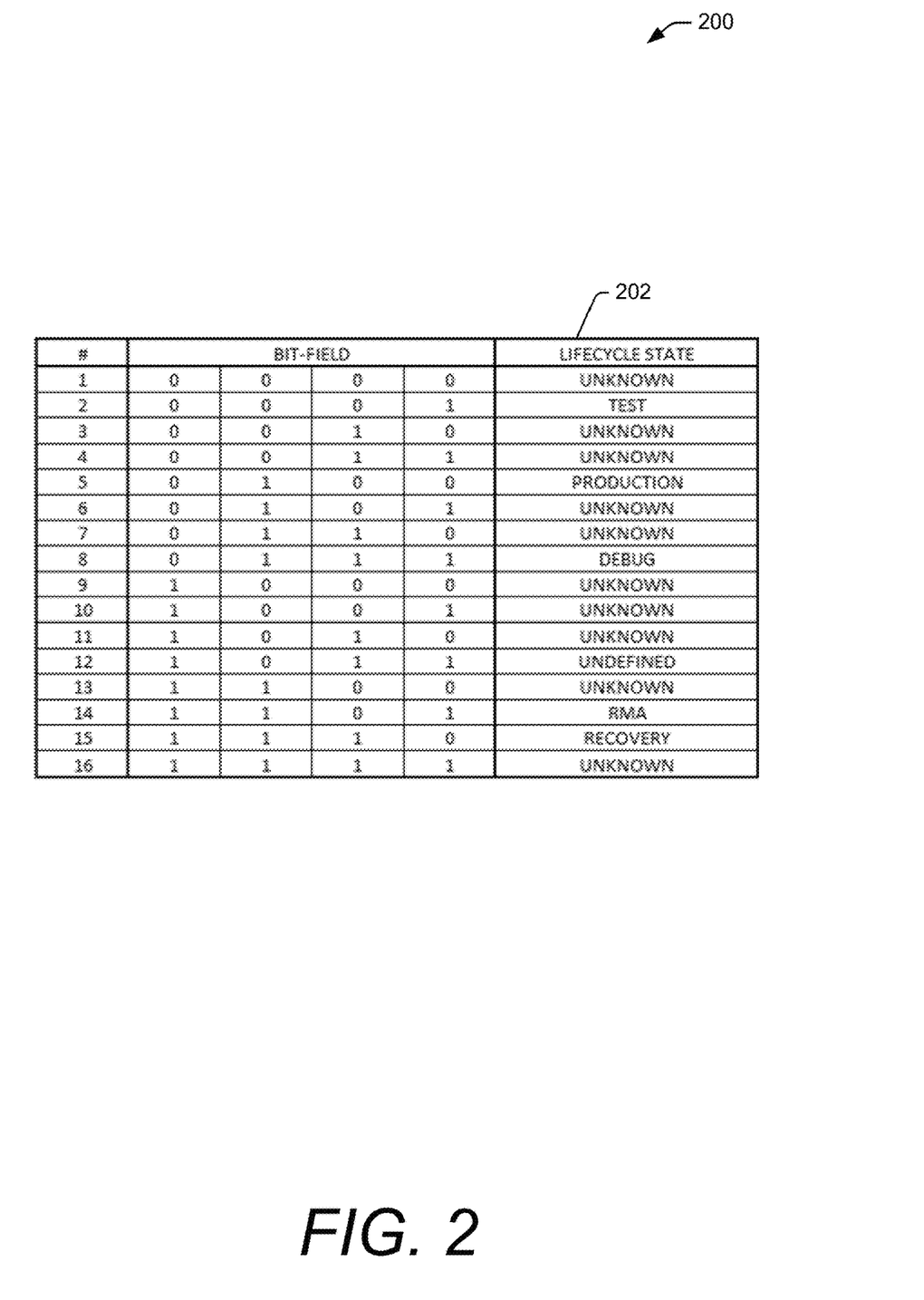
FIG. 2 illustrates example details of one or more lifecycle state identifiers that may be defined through combinations of bit values.

FIG. 2 illustrates example details 200 of one or more lifecycle state identifiers that may be defined through a combination of bit values. A lookup table 202 includes a bit-field having a size of four bits that may be used to assess a lifecycle state of an SoC IC device (e.g., the SoC IC device 102 of FIG. 1). In some instances, portions of the lookup table 202 (e.g., bit-fields corresponding to known states, unknown lifecycle states, and/or combinations thereof) may be stored in a non-volatile memory integrated circuitry (e.g., the non-volatile memory integrated circuitry 118 of the SoC IC device 102 of FIG. 1). Portions of the lookup table 202 (e.g., bit-fields corresponding to known lifecycle states, unknown lifecycle states, and/or combinations thereof) may also, in part or in whole, be stored in registers of logic (e.g., the logic integrated circuitry 116 of the SoC IC device 102 of FIG. 1, including the state-keeping logic integrated circuitry 120 and/or the security logic integrated circuitry 122) or another type of memory integrated circuitry (e.g., DRAM memory integrated circuitry that may be part of a computing device having the SoC IC device 102).

As illustrated, the size of the bit-field allows for up to sixteen combinations of bit values (e.g., life cycle states). In the lookup table 202, combination of bit values #1, #3, #4, #6, #7, #9, #10, #11, #13, and #16 correspond to an unknown lifecycle state (e.g., if combination of bit values #1, #3, #4, #6, #7, #9, #10, #11, #13, or #16 were input to a set of state-keeping logic integrated circuitry, such as the state-keeping logic integrated circuitry 120 of FIG. 1, security conditions of the SoC IC device 102 may be compromised).

Also as illustrated in FIG. 2, combination of bit values #2 corresponds to a test lifecycle state, combination of bit values #5 corresponds to a production lifecycle state, combination of bit values #8 corresponds to a debug lifecycle state, combination of bit values #14 corresponds to an RMA lifecycle state, and combination of bit values #15 corresponds to a recovery lifecycle state. Each of these combinations of bit values corresponds to a known lifecycle state and a respective security condition (e.g., if combination of bit values #2, #5, #8, #14, or #15 were input to a set of state-keeping logic integrated circuitry, such as the state-keeping logic integrated circuitry 120 of FIG. 1, the respective security condition effectuated upon the SoC IC device 102 of FIG. 1 would alter accordingly).

Also, as illustrated in FIG. 2, combination of bit values #12 corresponds to an undefined lifecycle state and an undefined security condition (e.g., if the combination of bit values #12 were input to a set of state-keeping logic integrated circuitry, such as the state-keeping logic integrated circuitry 120 of FIG. 1, the security condition effectuated upon the SoC IC device 102 of FIG. 1 would correspond to an undefined security condition, in which an unauthorized agent is prevented from accessing the SoC IC device 102).

In general, a design engineer may lay out a first portion of logic of an SoC IC device (e.g., the security logic integrated circuitry 122 of FIG. 1) to verify an input combination of bit values decodes to a valid lifecycle state combination of bit values through comparing the retrieved combination of bit values to available, stored combinations of bit values corresponding to known lifecycle states and/or unknown lifecycle states. In an instance where the combination of bit values decodes to a valid lifecycle state, the combination of bit values may be input into a second portion of logic integrated circuitry of the SoC IC device (e.g., after verifying the combination of bit values decodes to the valid lifecycle state, the security logic integrated circuitry 122 of FIG. 1 may pass the combination of bit values to the state-keeping logic integrated circuitry 120 of FIG. 1) to effectuate a corresponding level of security.

However, and in an instance where the combination of bit values does not decode to a valid lifecycle state, the first portion of the logic integrated circuitry may compensate by passing another combination of bit values that corresponds to an undefined lifecycle state to the second portion of the logic integrated circuitry (e.g., the security logic integrated circuitry 122 of FIG. 1 may pass the combination of bit values corresponding to the undefined lifecycle state to the state-keeping logic integrated circuitry 120 of FIG. 1). In this instance, the second portion of the logic integrated circuitry (e.g., the state-keeping logic integrated circuitry 120 of FIG. 1) may subsequently place the SoC IC device (e.g., the SoC IC device 102 of FIG. 1) into an undefined lifecycle state in which the SoC IC device is secure and access to the SoC IC device is limited. In some instances, transitioning from the undefined lifecycle state to another lifecycle state having a different degree of security (e.g., an RMA lifecycle state) may require providing the first portion of the logic integrated circuitry (e.g., the security logic integrated circuitry 122 of FIG. 1) and/or the second portion of the logic (e.g., the state-keeping logic integrated circuitry 120 of FIG. 1) an authorization message to enable the transition.

Example Scenarios

Figure 3:
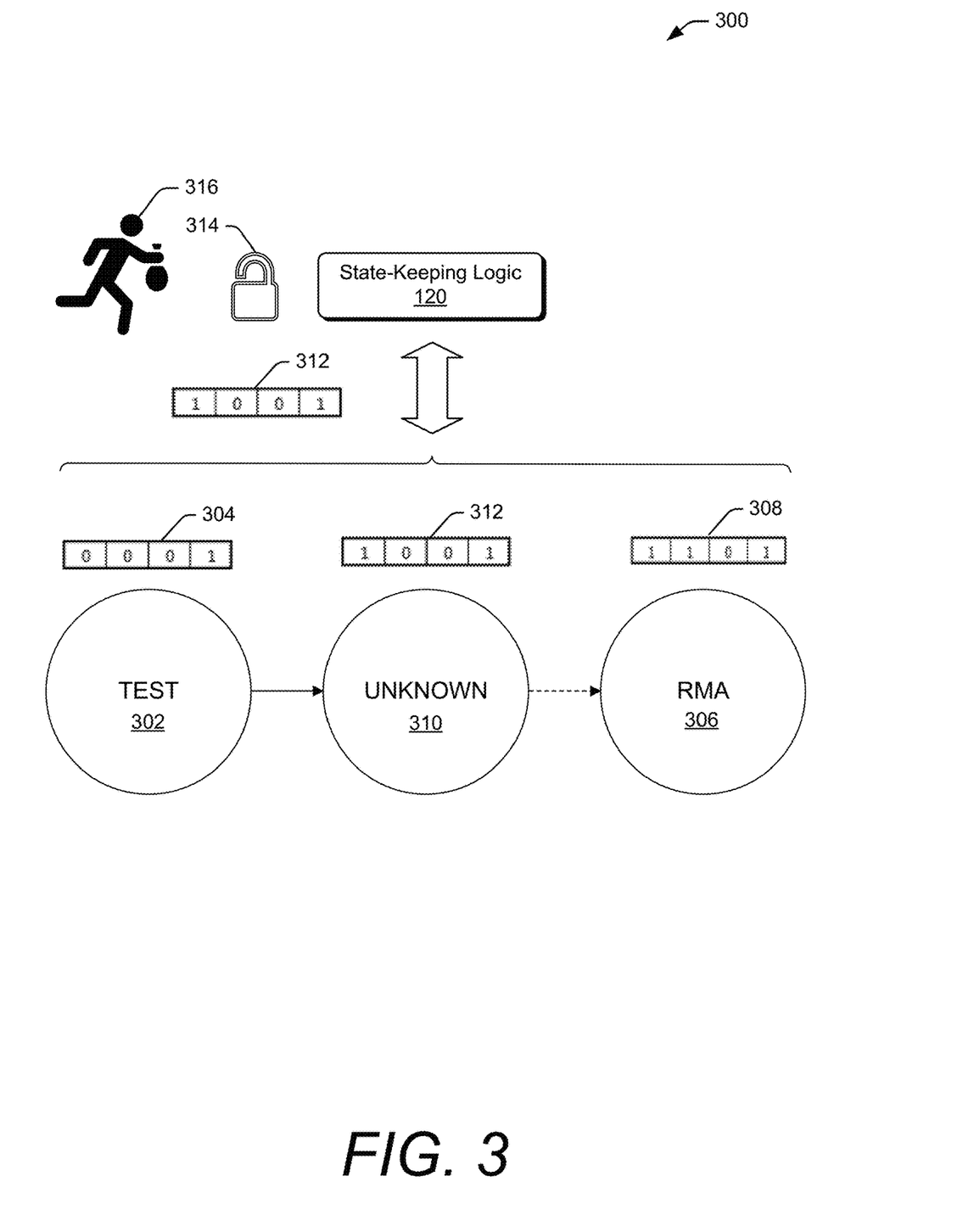
FIG. 3 illustrates an example scenario of state-keeping logic integrated circuitry of an SoC IC device inadvertently compromising security of the SoC IC device.

FIG. 3 illustrates an example scenario 300 of state-keeping logic integrated circuitry of an SoC IC device inadvertently compromising security of the SoC IC device. The state-keeping logic integrated circuitry, in some instances, may be the state-keeping logic integrated circuitry 120 of FIG. 1.

As illustrated by FIG. 3, and as opposed to having transitioned from a test lifecycle state 302 (e.g., corresponding to a test lifecycle state identifier 304 having a combination of bit values) to an RMA lifecycle state 306 (e.g., corresponding to an RMA lifecycle state identifier 308 having another combination of bit values), an SoC IC device (e.g., the SoC IC device 102 of FIG. 1) has transitioned to an unknown lifecycle state 310 (e.g., corresponding to an unknown lifecycle state identifier 312 having another combination of bit values). In some instances, the SoC IC device may be under a physical attack that disrupts storage cells of non-volatile memory integrated circuitry (e.g., the lifecycle state identifier cells 124 of the non-volatile memory integrated circuitry 118 of FIG. 1) storing a bit-field that includes a combination of bit values. Examples of physical attacks include disruption to a power source supplying power to the SoC IC device, a glitch introduced to a clocking mechanism of the SoC IC device, or a laser fault injection to storage cells of non-volatile memory integrated circuitry of the SoC IC device. In other instances, the SoC IC device may be experiencing a reliability failure within the memory storage cells of the non-volatile memory integrated circuitry.

In the scenario illustrated by FIG. 3, no security logic integrated circuitry (e.g., the security logic integrated circuitry 122 of FIG. 1) is present. With no security logic integrated circuitry present, the state-keeping logic integrated circuitry 120 retrieves, from the cells of the non-volatile memory integrated circuitry, an unknown combination of bit values (e.g., corresponding to the unknown lifecycle state identifier 312). As the state-keeping logic integrated circuitry 120 has not been designed or tested for the unknown lifecycle state identifier 312, an unknown lifecycle state-keeping logical behavior results, causing the state-keeping logic integrated circuitry 120 to inadvertently place the SoC IC device into the unknown lifecycle state 310 having a compromised security condition 314. While the SoC IC device is in the unknown lifecycle state 310 with the compromised security condition 314, an unknown behavior of the state keeping-logic integrated circuitry 120 may make it possible for an unauthorized agent 316 (e.g., a malicious hacker remote from the SoC IC device, a user banned from the SoC IC device, spyware, and so on) to obtain stored information, direct the SoC IC device to execute non-secure code, and so on.

Figure 4:
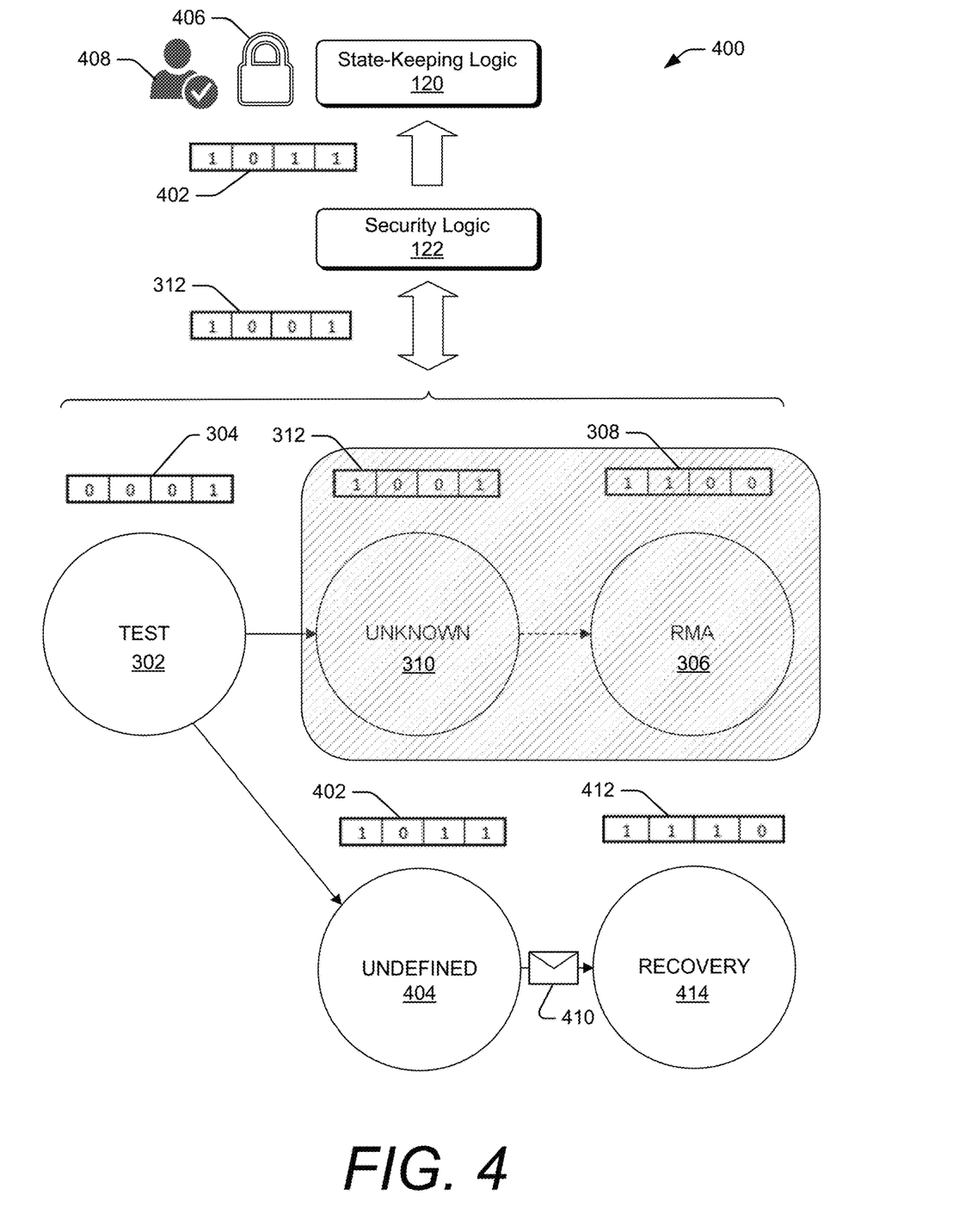
FIG. 4 illustrates an example scenario of security logic integrated circuitry of an SoC IC device maintaining security of the SoC IC device.

FIG. 4 illustrates an example scenario 400 of security logic integrated circuitry of an SoC IC device maintaining security of the SoC IC device. The security logic integrated circuitry may, in some instances, be the security logic integrated circuitry 122 of FIG. 1 and the state-keeping logic integrated circuitry, in some instances, may be the state-keeping logic integrated circuitry 120 of FIG. 1.

As illustrated by FIG. 4, as opposed to having transitioned from the test lifecycle state 302 (e.g., corresponding to the test lifecycle state identifier 304 having a combination of bit values) to the RMA lifecycle state 306 (e.g., corresponding to the RMA lifecycle state identifier 308 having another combination of bit values), the SoC IC device (e.g., the SoC IC device 102 of FIG. 1) has transitioned to the unknown lifecycle state 310 (e.g., corresponding to the unknown lifecycle state identifier 312 having another combination of bit values). In some instances, the SoC IC device may be under a physical attack that disrupts storage cells of non-volatile memory integrated circuitry (e.g., the lifecycle state identifier cells 124 of the non-volatile memory integrated circuitry 118 of FIG. 1) storing a bit-field that includes a combination of bit values. Examples of physical attacks include a disruption to a power source supplying power to the SoC IC device, a glitch introduced to a clocking mechanism of the SoC IC device, or a laser fault injection to storage cells of non-volatile memory integrated circuitry of the SoC IC device. In other instances, the SoC IC device may be experiencing a reliability failure within the memory storage cells of the non-volatile memory integrated circuitry.

However, and in contrast to FIG. 3, security logic integrated circuitry 122 is present on the SoC IC device. As illustrated in FIG. 4, the security logic integrated circuitry 122 (as opposed to the state-keeping logic integrated circuitry 120) retrieves the combination of bit values (e.g., corresponding to the unknown lifecycle state identifier 312) from the memory storage cells of the non-volatile memory integrated circuitry. In some instances, the security logic integrated circuitry 122 may determine that the retrieved combination of bit values fails to match a known lifecycle state identifier (e.g., the retrieved combination of bit values fails to match the combination of bit values #2, #5, #8, #14, or #15 as illustrated in the lookup table 202 of FIG. 2). Alternatively, the security logic integrated circuitry 122 may determine that the retrieved combination of bit values matches a pre-determined, unknown lifecycle state identifier (e.g., the retrieved combination of bit values matches the combination of bit values #10 as illustrated in the lookup table 202 of FIG. 2).

The security logic integrated circuitry 122 may include one or more combinations of logical comparators formed from logic inputs, AND gates, OR gates, XOR gates, NAND gates, NOR gates, XNOR gates, and/or NOT gates. Furthermore, and in some instances, the security logic integrated circuitry 122 can perform operations that include retrieving, from a lookup table (e.g., the lookup table 202 of FIG. 2), one or more combinations of bit values for comparison purposes.

In some instances, the security logic integrated circuitry 122 may retrieve the combination of bit values (e.g., corresponding to the unknown lifecycle state identifier 312) from the memory storage cells upon a power-up condition or a reset condition experienced by the SoC IC device. Alternatively, the security logic integrated circuitry 122 may retrieve the combination of value from the memory storage cells on a regular, continuous cadence during operation of the SoC IC device, continuously surveilling lifecycle states of the SoC IC device.

In response to determining that the combination of bit values fails to correspond to a known lifecycle state identifier (e.g., the retrieved combination of bit values fails to correspond to the RMA lifecycle state identifier 308), the security logic integrated circuitry 122 provides, to the state-keeping logic integrated circuitry 120, an undefined lifecycle state identifier 402 (e.g., a combination of bit values corresponding to an undefined lifecycle state 404). The security logic integrated circuitry 122 may also provide the undefined lifecycle state identifier 402 to the cells of the non-volatile memory integrated circuitry (e.g., overwrite contents of the lifecycle state identifier cells 124 of FIG. 1) so as to ensure that a subsequent query to the cells of the non-volatile memory integrated circuitry (by the state-keeping logic integrated circuitry 120, the security logic integrated circuitry 122, or other logic integrated circuitry of the IC device) will return a valid (e.g., current) lifecycle state identifier.

In response, the state-keeping logic integrated circuitry 120 places the SoC IC device into the undefined lifecycle state 404 having a safe security condition 406. While the SoC IC device is in the undefined lifecycle state 404, the SoC IC device may have limited functionality for security purposes (as an example, functionality of the SoC IC device may be restricted to verifying access rights). In general, while in the undefined lifecycle state 404, the state-keeping logic integrated circuitry 120 may prevent undefined behaviors of the SoC IC device that have a likelihood of leaking data or functions available through the SoC IC device.

The security logic integrated circuitry 122 may be designed to allow an authorized agent 408 (e.g., a technician, a security agent with authorization or permission) to generate an authorization message 410 and trigger a transition to a follow-up lifecycle state. For example, while the SoC IC device is in the undefined lifecycle state 404, the authorized agent 408 may provide, to the security logic integrated circuitry 122, the authorization message 410. The authorization message 410 may include, for example, a cryptographic signature, a message authentication code (MAC), or a password. In such an instance, the security logic integrated circuitry 122 may verify contents of the authorization message 410.

Upon verifying the contents of the authorization message 410, the security logic integrated circuitry 122 may provide, to the state-keeping logic integrated circuitry 120, a recovery lifecycle state identifier 412 (e.g., the combination of bit values #15 as illustrated in the lookup table 202 of FIG. 2) that causes the state-keeping logic integrated circuitry 120 to place the SoC IC device into a follow-up lifecycle state (e.g., recovery lifecycle state 414). The recovery lifecycle state 414 may be secure, protecting security of the SoC IC device while allowing diagnostics and/or testing of the SoC IC device. However, while the SoC IC device is in the recovery lifecycle state 414, the state-keeping logic integrated circuitry 120 may prevent code execution.

Example Method Using an Undefined Lifecycle State Identifier

Figure 5:
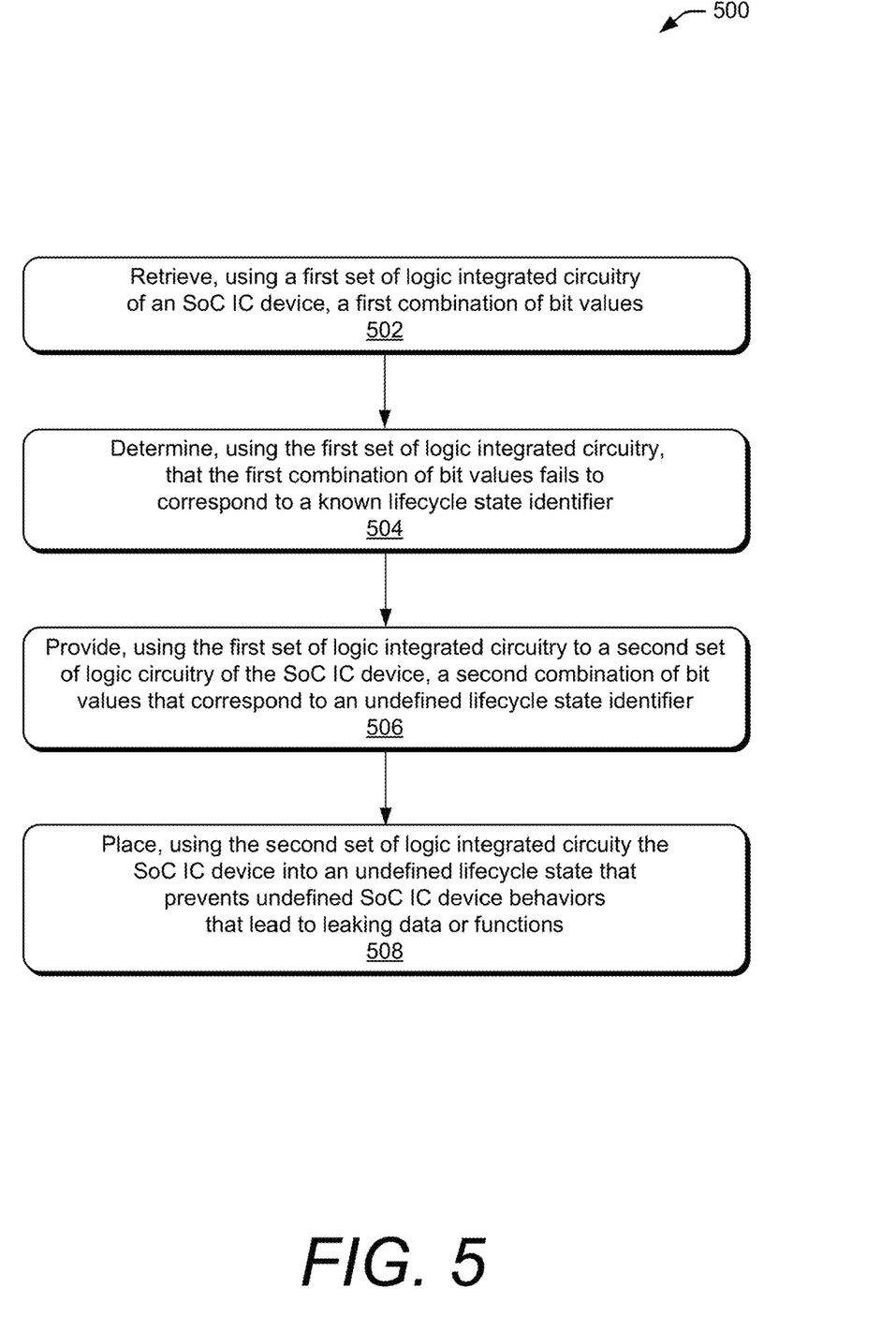
FIG. 5 illustrates an example method of managing security of an SoC IC device using an undefined lifecycle state identifier.

FIG. 5 illustrates details of an example method 500 of managing security of an SoC IC device using an undefined lifecycle state identifier. The method, illustrated by a series of operational blocks 502-508, may be performed by one or more elements of the SoC IC device 102 of FIG. 1. The method may also include elements of FIGS. 2-4. Sequencing of the operational blocks 502-508, including underlying or detailed elements of the operational blocks 502-508, is not limited by the illustration of FIG. 5 or by the description of FIG. 5 hereafter. The operational blocks 502-508, or portions of the operational blocks 502-508, may also be performed by one or more combinations of discrete IC devices having integrated circuitry that is similar to integrated circuitry included on the SoC IC device 102.

At block 502, a first set of logic integrated circuitry (e.g., the security logic integrated circuitry 122 of FIG. 1), retrieves a first combination of bit values (e.g., a combination of bit values corresponding to the unknown lifecycle state identifier 312 of FIG. 3) from non-volatile memory storage cells of the SoC IC device (e.g., the lifecycle state identifier cells 124 of FIG. 1). In some instances, the first set of logic integrated circuitry may retrieve the first combination of bit values in response to a power-up or reset condition experienced by the SoC IC device. In other instances, the first set of logic integrated circuitry may retrieve the first combination of bit values from the memory storage cells of the SoC IC device on a repeating, pre-determined cadence during operation of the SoC IC device.

At block 504, the first set of logic integrated circuitry determines that the first combination of bit values fails to correspond to a known lifecycle state identifier. In some instances, determining that the first combination of bit values fails to correspond to a known lifecycle state identifier may include comparing the first combination of bit values to one or more combinations of bit values retrieved from a lookup table.

At block 506, the first set of logic integrated circuitry provides, to a second set of logic integrated circuitry (e.g., the state-keeping logic integrated circuitry 120 of FIG. 1), a second combination of bit values (e.g., a second combination of bit values corresponding to the undefined lifecycle state identifier 402 of FIG. 4). Furthermore, and in some instances, the first set of logic integrated circuitry may provide the second combination of bit values to the non-volatile memory storage cells (e.g., "overwrite" the first combination of bit values within the non-volatile memory storage cells with the second combination of bit values so as to ensure that queries to the non-volatile memory storage cells return a valid lifecycle state).

At block 508 the second set of logic integrated circuitry places the SoC IC device into an undefined lifecycle state in which the SoC IC device is secure. While in the undefined lifecycle state, the second set of logic integrated circuitry prevents an unauthorized agent from accessing data or functions available through the SoC IC device.

The method 500 may be extended to include additional operations. For instance, after being placed in the undefined lifecycle state, the first set of logic integrated circuitry may receive, from an external agent, an authorization message (e.g., the authorization message 410 of FIG. 4). The first set of logic may decrypt the key to determine that the external agent is an authorized external agent. The first set of logic integrated circuitry may then provide, to the second set of logic integrated circuitry, a third combination of bit values (e.g., a combination of bit values that correspond to the recovery lifecycle state identifier 412 of FIG. 4). In response, the second set of logic integrated circuitry may place the SoC IC device into a recovery lifecycle state in which the SoC IC device is secure, wherein testing or diagnostics of the SoC IC device is allowed (while accessing data or functions available through the SoC IC device is prevented).

Although techniques using undefined lifecycle state identifier to manage security of an integrated circuit (IC) device presented herewithin, it is to be understood that the subject of the appended claims is not necessarily limited to the specific features or methods described. Rather, the specific features and methods are disclosed as example ways in which using undefined lifecycle state identifier to manage security of an integrated circuit (IC) device can be implemented.

Additional Examples

In the following paragraphs, several examples are described:

In one example, there is a method performed by an SoC IC device. The method may comprise retrieving, by a first set of logic integrated circuitry of the SoC IC device and from non-volatile memory storage cells of the SoC IC device, a first combination of bit values; determining, by the first set of logic integrated circuitry, that the first combination of bit values fails to correspond to a known lifecycle state identifier; providing, by the first set of logic integrated circuitry to a second set of logic integrated circuitry of the SoC IC device, a second combination of bit values, the second combination of bit values corresponding to an undefined lifecycle state identifier; and placing, by the second set of logic integrated circuitry, the SoC IC device into an undefined lifecycle state in which the SoC IC device is secure, the undefined lifecycle state preventing undefined behaviors of the SoC IC device that lead to leaking data or functions available through the SoC IC device.

The first set of logic integrated circuitry may retrieve the first combination of bit values in response to a power-up condition experienced by the SoC IC device.

The first set of logic integrated circuitry may retrieve the first combination of bit values in response to a reset condition experienced by the SoC IC device.

The first set of logic integrated circuitry may retrieve the first combination of bit values on a repeating, pre-determined cadence during operation of the SoC IC device.

Determining that the first combination of bit values fails to correspond to a known lifecycle state identifier may include comparing the first combination of bit values to one or more combinations of bit retrieved from a lookup table.

An authorization message may be received by the first set of logic integrated circuitry from an external agent. The first set of logic integrated circuitry may verify, contents of the authorization message and provide, to the second set of logic integrated circuitry, a third combination of bit values that correspond to a recovery lifecycle state identifier. The second set of logic integrated circuitry may place the system-on-chip integrated circuit device into a recovery lifecycle state in which the system-on-chip integrated circuit device is secure, the recovery lifecycle state allowing testing or diagnostics of the system-on-chip integrated circuit device while preventing access to data or functions available through the system-on-chip integrated circuit device.

Verifying the contents of the authorization message may include verifying a cryptographic signature or a message authentication code.

Verifying the contents of the authorization message may include verifying a password.

The first set of logic integrated circuitry may provide, to the non-volatile memory storage cells, the second combination of bit values.

In another example, there is provided one or more computer readable media carrying instructions configured to cause a computer apparatus to carry out the method of the example set out above, or any methods described herein.

In another example described herein, there is provided an apparatus that is configured to perform the method of the example set out above or any method described herein. For example, an apparatus may comprise: non-volatile memory storage cells; and logic integrated circuitry including a first set of logic integrated circuitry and a second set of logic integrated circuitry, the logic integrated circuitry configured to: retrieve, using the first set of logic integrated circuitry and from the non-volatile memory storage cells, a first combination of bit values; determine, using the first set of logic integrated circuitry, that the first combination of bit values fails to correspond to a known lifecycle state identifier; provide, to the second set of logic integrated circuitry using the first set of logic integrated circuitry, a second combination of bit values, the second combination of bit values corresponding to an undefined lifecycle state identifier; and place, using the second set of logic integrated circuitry, the apparatus into an undefined lifecycle state, the undefined lifecycle state preventing undefined behaviors of the apparatus that lead to leaking data or functions available through apparatus.

The non-volatile memory storage cells may include one-time programmable cells.

The first logic circuitry and the second logic circuitry may each include respective logic inputs.

The first set of logic integrated circuitry may include one or more comparators.

The apparatus may include an SoC IC device having the first set of logic integrated circuitry, the non-volatile memory storage cells, and the second set of logic integrated circuitry.

In some examples, at least one of the first set of logic integrated circuitry, the non-volatile memory storage cells, or the second set of logic integrated circuitry is part of a discrete integrated circuit device that does not include each of the first set of logic integrated circuitry, the non-volatile memory storage cells, and the second set of logic integrated circuitry.

What is claimed is:

1. A method performed by a system-on-chip integrated circuit device, the method comprising:
   retrieving, by a first set of logic circuitry of the system-on-chip integrated circuit device, a first combination of bit values from non-volatile memory storage cells of the system-on-chip integrated circuit device;
   determining, by the first set of logic circuitry, that the first combination of bit values fails to correspond to a known lifecycle state identifier;
   providing, by the first set of logic circuitry, a second combination of bit values to a second set of logic circuitry of the system-on-chip integrated circuit device, the second combination of bit values corresponding to an undefined lifecycle state identifier; and
   placing, by the second set of logic circuitry, the system-on-chip integrated circuit device into an undefined lifecycle state in which the system-on-chip integrated circuit device is secure, the undefined lifecycle state preventing undefined behaviors of the system-on-chip integrated circuit device that expose to leaking data or functions available through the system-on-chip integrated circuit device.

2. The method as recited by claim 1, wherein the first set of logic circuitry retrieves the first combination of bit values in response to a power-up condition experienced by the system-on-chip integrated circuit device.

3. The method as recited by claim 1, wherein the first set of logic circuitry retrieves the first combination of bit values in response to a reset condition experienced by the system-on-chip integrated circuit device.

4. The method as recited by claim 1, wherein the first set of logic circuitry retrieves the first combination of bit values repeatedly during operation of the system-on-chip integrated circuit device based on a predefined interval.

5. The method as recited by claim 1 wherein determining that the first combination of bit values fails to correspond to a known lifecycle state identifier comprises:
 comparing the first combination of bit values to one or more combinations of bits retrieved from a lookup table.

6. The method as recited by claim 1 further comprising:
 receiving, by the first set of logic circuitry, an authorization message from an external agent;
 verifying, by the first set of logic integrated circuitry, contents of the authorization message;
 providing, by the first set of logic circuitry, a third combination of bit values that correspond to a recovery lifecycle state identifier to the second set of logic circuitry; and
 placing, by the second set of logic circuitry, the system-on-chip integrated circuit device into a recovery lifecycle state in which the system-on-chip integrated circuit device is secure, the recovery lifecycle state allowing testing or diagnostics of the system-on-chip integrated circuit device while preventing access to data or functions available through the system-on-chip integrated circuit device.

7. The method as recited by claim 6, wherein verifying the contents of the authorization message includes verifying a cryptographic signature or a message authentication code.

8. The method as recited by claim 6, wherein verifying the contents of the authorization message includes verifying a password.

9. The method as recited by claim 1 further comprising providing, by the first set of logic circuitry, the second combination of bit values to the non-volatile memory storage cells.

10. An apparatus comprising:
 non-volatile memory storage cells; and
 logic circuitry including a first set of logic circuitry and a second set of logic circuitry, the logic circuitry configured to:
  retrieve, using the first set of logic circuitry, a first combination of bit values from the non-volatile memory storage cells;
  determine, using the first set of logic circuitry, that the first combination of bit values fails to correspond to a known lifecycle state identifier of the apparatus;
  provide, using the first set of logic circuitry, a second combination of bit values to the second set of logic circuitry, the second combination of bit values corresponding to an undefined lifecycle state identifier; and
  place, using the second set of logic circuitry, the apparatus into an undefined lifecycle state in which the apparatus is secure, the undefined lifecycle state preventing undefined behaviors of the apparatus that expose data or functions available through apparatus.

11. The apparatus as recited by claim 10, wherein the non-volatile memory storage cells include one-time programmable cells.

12. The apparatus as recited by claim 10, wherein the first set of logic circuitry and the second set of logic circuitry each include respective logic inputs.

13. The apparatus as recited by claim 10, wherein the first set of logic circuitry includes one or more comparators.

14. The apparatus as recited by claim 10, wherein the apparatus includes a system-on-chip integrated circuit device that comprises the first set of logic circuitry, the non-volatile memory storage cells, and the second set of logic circuitry.

15. The apparatus as recited by claim 10, wherein at least one of the first set of logic circuitry, the non-volatile memory storage cells, or the second set of logic circuitry is part of a discrete integrated circuit device that does not include each of the first set of logic circuitry, the non-volatile memory storage cells, and the second set of logic circuitry.

16. The apparatus as recited by claim 10, wherein the logic circuitry is configured to:
 provide, using the first set of logic circuitry, the second combination of bit values to the non-volatile memory storage cells.

17. The apparatus as recited by claim 10, wherein the logic circuitry is configured to:
 receive, using the first set of logic circuitry, an authorization message from an external agent;
 verify, using the first set of logic circuitry, contents of the authorization message;
 provide, using the first set of logic circuitry, a third combination of bit values that correspond to a recovery lifecycle state identifier to the second set of logic circuitry; and
 place, using the second set of logic circuitry, the apparatus into a recovery lifecycle state in which the apparatus is secure, the recovery lifecycle state allowing testing or diagnostics of the apparatus while preventing access to data or functions available through the apparatus.

18. The apparatus as recited by claim 17, wherein to verify the contents of the authorization message comprises to verify a cryptographic signature of the authorization message.

19. The apparatus as recited by claim 17, wherein to verify the contents of the authorization message comprises to verify a message authentication code of the authorization message.

20. The apparatus as recited by claim 17, wherein to verify the contents of the authorization message comprises to verify a password of or associated with the authorization message.

* * * * *

UNITED STATES PATENT AND TRADEMARK OFFICE
CERTIFICATE OF CORRECTION

| | | |
|---|---|---|
| PATENT NO. | : 12,141,331 B2 | Page 1 of 1 |
| APPLICATION NO. | : 17/636892 | |
| DATED | : November 12, 2024 | |
| INVENTOR(S) | : Andrei Tudor Stratan and Olivier Jean Benoit | |

It is certified that error appears in the above-identified patent and that said Letters Patent is hereby corrected as shown below:

In the Claims

Column 12, Line 53, after "expose" before "data", delete "to leaking".
Column 13, Line 10, after "logic" before "circuitry", delete "integrated".

Signed and Sealed this
Twenty-fourth Day of December, 2024

Derrick Brent
*Acting Director of the United States Patent and Trademark Office*